3,457,289
REACTIONS PRODUCTS OF CHLORIDES OF Al(III) AND Fe(III), WITH BORATE ESTERS
Robert C. Wade, Ipswich, Mass., assignor to Ventron Corporation, Beverly, Mass., a corporation of Massachusetts
No Drawing. Original application Sept. 25, 1967, Ser. No. 670,419. Divided and this application Sept. 25, 1967, Ser. No. 670,450
Int. Cl. C07f 5/02; D06m 13/50; A61k 27/00
U.S. Cl. 260—439
10 Claims

ABSTRACT OF THE DISCLOSURE

Products made by reacting chlorides of metals selected from Al(III) and Fe(III) with borates esters such as trimethyl borate, triethyl borate, tripropyl borate, tributyl borate, trihexyl borate, trihexylene glycol biborate, and tri(m,p) cresyl borate in a molar ration of at least about 0.33 mole of the selected borate ester for each mole of the chloride of the selected metal in a diluent, such as the selected borate ester, methylene chloride, chloroform, and carbon tetrachloride, at a temperature between room temperature and about 200° C. until the reaction mixture ceases to give off organic chloride thereby forming a liquor comprising the diluent and a compound of complex chemical structure comprising the selected metal, boron, carbon, hydrogen, chlorine, and oxygen. The complex compound is isolated by removing volatile material from the reaction mixture by evaporation.

The complex reaction product of ferric chloride with trimethyl borate may be applied to glass, cotton and cotton polyester fabrics. The complex reaction product of aluminum trichloride and trimethyl borate can be applied to textile fabrics, especially cellulosics and may be utilized as an antiperspirant, deodorant and bacteriocide in cosmetic applications.

This invention relates to products of unknown complex chemical structure prepared by reacting the chloride of a metal selected from Al(III) and Fe(III) with certain borate esters and is a division of my copending application Ser. No. 670,419, filed Sept. 25, 1967.

The above mentioned copending application discloses the preparation of highly useful products of complex chemical structure which are the reaction products of trimethyl borate with the chloride of a metal selected from the group consisting of Ti(IV), Zr(IV), Hf(IV), Al(III), Fe(III), Mo(V), Nb(V), Sn(IV), Si(IV), Ta(V), W(VI), and mixtures of such chlorides. While it is preferred to employ trimethyl borate, it may be replaced by other borate esters, such as triethyl borate, tripropyl borate, tributyl borate, trihexyl borate, trihexylene glycol biborate, tri(m,p) cresyl borate, and mixtures thereof or a mixture of one or more of such borate esters with trimethyl borate.

In forming these products of unknown complex chemical structure using trimethyl borate, the substantially anhydrous chloride of the selected metal is mixed with substantially anhydrous trimethyl borate in a molar ratio of at least about 0.33 mole of borate ester for each mole of the chloride of the selected metal, preferably, in a substantially anhydrous inert diluent, such as methylene chloride, chloroform, carbon tetrachloride, or an excess of trimethyl borate. The reactions may be carried out between room temperature and about 120° C. The order of addition of the reagents is not critical. Thus, the metal chloride may be added to the boron ester, or the boron ester may be added to the metal chloride, or both may be added simultaneously to the reaction zone.

In the case of the very reactive combinations of reagents, such as titanium tetrachloride or ferric trichloride with trimethyl borate, the reactions start immediately at room temperature and the temperature of the reaction mixture rises slightly with methyl chloride being given off. In the case of less reactive combinations of reagents, it is often necessary to heat the reagents mildly, for example, to the boiling point of methylene chloride (40.1° C.) or trimethyl borate (67°–68° C.), or in a few cases to temperatures as high as 90°–120° C. In the case of silicon tetrachloride the reaction is very slow but the rate of reaction may be accelerated by the addition of a minor amount of more reactive metal chloride as a promoter, such as ferric chloride or titanium tetrachloride, etc.

When methyl chloride ceases to be given off the reaction is complete and the desired reaction product may be isolated by evaporation of volatile material, such as the diluent or excess reagent. This may be accomplished by applying a vacuum to the reaction vessel while gently heating. In some cases, the reaction product is highly soluble in the reaction medium, therefore, stronger heating under vacuum is required to remove the volatile material. In general, temperatures not over 100° C. under a final vacuum of 1–20 mm. of mercury are sufficient to remove the volatile material. Most of the reaction products appear to be polymeric in nature and very complex in chemical structure.

When reacting a mixture of chlorides of selected metals with a borate ester, at least about 0.33 mole of the selected borate is used for each sum of the molar proportions of the chlorides of the selected metals.

When producing a complex product produced by the reaction of the chloride of at least two selected metals with trimethyl borate, it is often preferable to react one of the metal chlorides with the borate completely as previously described but without isolating the complex reaction produce. The chloride of another selected metal, in a molar quantity not greater than the molar quantity of the chloride of the first selected metal, then may be added to the reaction liquor and be reacted with the previously formed complex reaction product at a temperature between room temperature and about 120° C. After the second reaction has been completed, as indicated when methyl chloride ceases to be given off, volatile material is removed by evaporation to isolate the second complex reaction product. This method is particularly advantageous when it is desired to react a very reactive metal chloride, such as titanium tetrachloride or ferric chloride, and a less reactive metal chloride, such as $SiCl_4$, with trimethyl borate.

The method for reacting the chlorides of the previously mentioned group of metals with other borate esters, such as triethyl borate, tripropyl borate, tributyl borate, trihexyl borate, trihexylene glycol biborate, tri(m,p) cresyl borate, and mixtures thereof or a mixture of one or more of such borates with trimethyl borate is similar to that described for the reaction with trimethyl borate. With these borate esters, however, the reactions are, in general, considerably slower and temperatures up to about 200° C. may be used to obtain reasonable reaction rates. Since the boiling points of the organic chloride by-products are considerably higher than methyl chloride, they must be distilled or evaporated from the reaction product by heating the reaction mixture at either atmospheric or reduced pressure.

The complex reaction product produced by reacting ferric chloride with trimethyl borate, when applied as a solution and dried, will produce a light golden yellow, permanent, water repellant mineral dyeing on glass, cotton and cotton-polyester fabrics.

The complex reaction product of aluminum trichloride and trimethyl borate can be used from water solutions to develop excellent water repellant finishes on many textile fabrics, especially cellulosics. It also exhibits good dye fixing properties for direct dyes on cellulose fabrics. This complex product also shows excellent activity as an antiperspirant, deodorant and bacteriocide in cosmetic applications.

The complex products prepared with trimethyl borate still contain unreacted chlorine atoms. The halogens are still reactive toward many organic groups which contain a reactive hydrogen atom, such as amino, hydroxyl, or carboxyl groups. The reaction products of $TiCl_4$, $ZrCl_4$, $FeCl_3$, $TaCl_5$, $NbCl_5$, and $SnCl_4$ with trimethyl borate in particular react vigorously with alkyl or aryl amines; with polyamines; with alcohols; and with carboxylic acids and their salts to produce derivatives of enhanced properties for a wide variety of applications. Thus, these complex products may be reacted, for example, with lauryl amine to give new products which have high surface activity in water and which contain both the parent metal atom and boron.

The complex reaction products prepared by reacting the chlorides of the group of metals previously mentioned with borate esters, such as triethyl borate, tripropyl borate, tributyl borate, trihexyl borate, trihexylene glycol biborate, and tri(m,p)cresyl borate also contain unreacted chlorine atoms. These halogens are still reactive toward many organic groups which contain a reactive hydrogen atom and react therewith similar to the reaction products made with trimethyl borate. In general, the properties of these complex reaction products are similar to those prepared with corresponding metal chlorides and trimethyl borate.

The compositions of the complex reaction products of the borate esters appears to vary with the molar ratios of borate ester to metal chloride as indicated by the amount of by-product organic chloride given off. The properties of the complex reaction products described herein are the properties possessed by products obtained by reacting the metal chlorides with the maximum amounts of borate esters which in turn varies with the metal chloride and borate ester used.

In addition to the inert diluents previously mentioned these complex reactions may also be carried out in aliphatic hydrocarbons, such as petroleum ether, hexane, heptane, octane, and cyclohexane. However, the reactions proceed much more slowly in these diluents and, therefore, are not preferred.

The invention is illustrated further by the following specific examples.

Example 1

81 grams (0.5 mole) of anhydrous ferric chloride and 200 grams of methylene chloride were placed in a stirred reaction flask which was fitted with an addition funnel, thermometer and reflux condenser. The reflux condenser in turn was connected to an empty safety trap, then to a water scrubber, and then to a gas meter. The entire system was closed up to the gas meter. 104 grams (1 mole) of anhydrous trimethyl borate were added from the addition funnel to the stirred reaction flask over a period of 50 minutes. The temperature rose spontaneously from 22° C. to about 34° C. over the course of the reaction. Methyl chloride was given off all during the course of the addition of the trimethyl borate. When all of the methyl borate was added, the reaction mixture was heated further to about 45° C. for an additional 40 minutes. A total of about 11.6 liters (about 0.5 mole) of $CH_3Cl$ (B.P. 24.2° C.) was given off during the reaction.

When the reaction ceased, most of the methylene chloride was removed by distillation at atmospheric pressure. The remaining liquids were removed by applying a vacuum to the reaction flask and warming the flask. There remained in the flask 116 grams of golden brown free-flowing powder. A 1 percent aqueous solution of this powder was clear, reddish-brown in color with pH of 2.5.

Elemental analysis of the product showed Fe, 25.8%; B, 6.0%; Cl, 25.5%; C. 19%; H, 3.2%, and O (by difference), 20.5%.

In similar experiments, triethyl borate was reacted with $AlCl_3$, $ZrCl_4$, $HfCl_4$, $FeCl_3$, $SnCl_4$, $MoCl_5$, $TaCl_5$, $NbCl_5$, $WCl_6$.

Example 2

In the same equipment used in Example 1, 134 grams (1 mole) of powdered, anhydrous $AlCl_3$ was suspended in 400 grams of methylene chloride. To this stirred mass was added 208 grams (2 moles) of trimethyl borate at a controlled rate. The temperature of the reaction mixture increased spontaneously from 21° C. to about 38° C. As the reaction progressed, the initial undissolved $AlCl_3$, giving off 1 mole of $CH_3Cl$, the reaction mixture became a thick pasty mass. As this reaction was heated to 40°–45° C. with a heating mantle, more $CH_3Cl$ was given off and the reaction mass quickly thinned out to an easily-stirred slurry. When the reaction was complete, about two moles of $CH_3Cl$ had been given off. There was recovered about 210 grams of tannish white solids which were very soluble in water without precipitation. The pH of a 1% solution in water was about 4.0. It appears that two moles of trimethyl borate react with one mole of $AlCl_3$ under these experimental conditions.

Elemental analysis of the product showed Al, 11.2%; Cl, 24.4%; B, 7.0%; C, 20.2%; H, 4.8%; and O (by difference), 32.4%.

In similar experiments, tributyl borate, trihexyl borate, trihexylene glycol biborate, and tri(m,p) cresyl borate were reacted with $AlCl_3$, $ZrCl_4$, $HfCl_4$, $FeCl_3$, $SnCl^4$, $MoCl_5$, $TaCl_5$, $NbCl_5$, $WCl_6$, and $Cu_2Cl_2$.

Example 3

In equipment similar to that used in Example 1, 7 grams of $AlCl_3$ (0.05 mole) was suspended in 100 grams of carbon tetrachloride in the reaction flask. To this stirred mixture was quickly added 20 grams (0.10 mole) of tripropyl borate at room temperature. The temperature quickly increased about 12° C. and the reaction product became soluble to give a greenish-brown solution. The reaction mixture was heated to 80° C. and then the residual liquors were removed by distillation and heating under vacuum. The final product was a tannish-white solid which burned when ignited with a bright green flame. The product was appreciably soluble in water.

In similar experiments, tributyl borate, trihexyl borate, and tri(m,p) cresyl borate were reacted with $AlCl_3$, $ZrCl_4$, $HfCl_4$, $FeCl_3$, $SnCl_4$, $MoCl_5$, $TaCl_5$, $NbCl_5$ and $WCl_6$.

In my copending application Ser. No. 670,419, filed Sept. 25, 1967 I have claimed methods for producing compounds of unknown complex chemical structure by reacting borate esters selected from the group consisting of trimethyl borate, triethyl borate, tripropyl borate, tributyl borate, trihexyl borate, trihexylene glycol biborate, and tri(m,p) cresyl borate with a chloride of a metal selected from the group consisting of Ti(IV), Zr(IV), Hf(IV), Sn(IV), and Si(IV) together with the complex compounds formed thereby.

In my copending application Ser. No. 670,449 filed Sept. 25, 1967 I have claimed methods for producing compounds of unknown complex chemical structure by reacting borate esters selected from the group consisting of trimethyl borate, triethyl borate, tripropyl borate, tributyl borate, trihexyl borate, trihexylene glycol biborate, and tri (m,p) cresyl borate with a chloride of a metal selected from the group consisting of Mo(V), Nb(V), Ta(V), and W(VI) together with the complex compounds formed thereby.

In my copending application Ser. No. 670,418, filed Sept. 25, 1967 I have claimed methods for producing compounds of unknown complex chemical structure by reacting borate esters selected from the group consisting of trimethyl borate, triethyl borate, tripropyl borate, tributyl borate, trihexyl borate, trihexylene glycol biborate, and tri(m,p) cresyl borate with a mixture of at least two two chlorides of metals selected from the group consisting of Ti(IV), Zr(IV), Hf(IV), Sn(IV), Si(IV), Al(III), Fe(III), Mo(V), Ta(V), and W(VI) together with the complex compounds formed thereby.

In my copending application Ser. No. 670,417, filed Sept. 25, 1967 I have claimed methods for producing compounds of unknown complex chemical structure by reacting borate esters selected from the group consisting of trimethyl borate, triethyl borate, tripropyl borate, tributyl borate, trihexyl borate, trihexylene glycol biborate, and tri(m,p)cresyl borate with a chloride of a first metal selected from the group consisting of Ti(IV), Zr(IV), Hf(IV), Sn(IV), Si(IV), Al(III), Fe(III), Mo(V), Nb(V), Ta(V), and W(VI) in an inert diluent to form a liquor comprising the diluent and a first compound of complex chemical structure and then adding to the liquor the chloride of a second metal selected from said group and permitting it to react with said compound of complex chemical structure to form a second compound of complex chemical structure comprising both of the selected metals, boron, carbon, hydrogen, chlorine, and oxygen.

I claim:
1. The method which comprises mixing at least one substantially anhydrous borate ester selected from the group consisting of trimethyl borate, triethyl borate, tripropyl borate, tributyl borate, trihexyl borate, trihexylene glycol biborate, and tri(m,p), cresyl borate with a substantially anhydrous chloride of a metal selected from the group consisting of Al(III) and Fe(III) in a molar ratio of at least 0.33 mole of the selected borate for each mole of the chloride of the selected metal in an inert substantially anhydrous diluent, permitting the chloride of the selected metal to react with the selected borate at a temperature between room temperaure and about 200° C. until the reaction mixture ceases to give off organic chloride thereby forming a liquor comprising said diluent and a compound of complex chemical structure comprising the selected metal, boron, carbon, hydrogen, chlorine, and oxygen.

2. The method as claimed by claim 1 wherein said diluent is selected from the group consisting of the selected borate, methylene chloride, chloroform, and carbon tetrachloride.

3. A compound of complex chemical structure produced by the method claimed by claim 1.

4. The method which comprises mixing substantially anhydrous trimethyl borate with a substantially anhydrous chloride of a metal selected from the group consisting of Al(III) and Fe(III) in a molar ratio of at least about 0.33 mole of said borate for each mole of the chloride of the selected metal in a substantially anhydrous diluent, permitting the chloride of the selected metal to react with said borate at a temperaure between room temperature and about 120° C. until the reaction mixture ceases to give off methyl chloride thereby forming a liquor comprising said diluent and a compound of complex chemical structure comprising the selected metal, boron, carbon, hydrogen, chlorine, and oxygen.

5. The method as claimed by claim 4 wherein said diluent is selected from the group consisting of said borate, methylene chloride, chloroform, and carbon tetrachloride.

6. A compound of complex chemical structure produced by the method claimed by claim 4.

7. The method claimed by claim 4 wherein the chloride of the selected metal is aluminum trichloride.

8. The method claimed by claim 4 wherein the chloride of the selected metal is ferric chloride.

9. A compound of complex chemical structure produced by the method claimed by claim 7.

10. A compound of complex chemical structure produced by the method claimed by claim 8.

References Cited
UNITED STATES PATENTS

| | | | |
|---|---|---|---|
| 2,312,208 | 2/1943 | Clayton et al. | 260—429 XR |
| 2,346,155 | 4/1944 | Denison et al. | 260—429 XR |
| 2,440,750 | 5/1948 | Kraus et al. | 260—429.3 XR |
| 2,491,116 | 12/1949 | Kraus et al. | 260—429.3 XR |
| 2,541,851 | 2/1951 | Wright. | |
| 2,597,920 | 5/1952 | Carroll | 260—429.5 XR |
| 2,941,981 | 6/1960 | Elbing et al. | 260—429.5 XR |
| 3,296,242 | 1/1967 | Turner et al. | 260—429.3 XR |

OTHER REFERENCES

Chemical Abstracts: vol. 32, p. 2511 (1938).
Chemical Abstracts: vol. 54, p. 14100 (1960).
Thur. Obshch. Khimii vol. 27, pp. 1476–79 (1957) (QD–1–Z6).
Chainani et al.: J. Chem. Soc., pp. 3168–70 (1960) (QD–1–C6).
Steinberg: Organoboron Chemistry, Intersc. Publ., John Wiley & Sons, Inc. New York (1964) vol. 1, pp. 144–46, 530 (Copy in Gr. 112; QD–412. Bl–5.8–C.7).

TOBIAS E. LEVOW, Primary Examiner

H. M. S. SNEED, Assistant Examiner

U.S. Cl. X.R.

106—2, 15; 117—124, 135.5, 144.5; 260—438.1, 448, 999